(12) United States Patent
Honjo (10) Patent No.: US 10,174,721 B2
(45) Date of Patent: Jan. 8, 2019

(54) CANISTER (71) Applicant: MAZDA MOTOR CORPORATION, Aki-gun, Hiroshima (JP)

(72) Inventor: Takuya Honjo, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/768,508

(22) PCT Filed: Oct. 26, 2016

(86) PCT No.: PCT/JP2016/081715
§ 371 (c)(1),
(2) Date: Apr. 13, 2018

(87) PCT Pub. No.: WO2017/082053
PCT Pub. Date: May 18, 2017

(65) Prior Publication Data
US 2018/0298852 A1 Oct. 18, 2018

(30) Foreign Application Priority Data
Nov. 10, 2015 (JP) .................. 2015-220666

(51) Int. Cl.
*F02M 25/08* (2006.01)
*B01D 53/047* (2006.01)

(52) U.S. Cl.
CPC ....... *F02M 25/0872* (2013.01); *B01D 53/047* (2013.01); *F02M 25/0854* (2013.01);
(Continued)

(58) Field of Classification Search
CPC .......... F02M 25/0854; F02M 25/0872; B01D 2259/402; B01D 2259/4516; B01D 2259/4566
(Continued)

(56) References Cited

U.S. PATENT DOCUMENTS 4,598,686 A * 7/1986 Lupoli ............... F02M 25/0854
123/519
4,951,643 A * 8/1990 Sato .................... F02M 25/0836
123/519
(Continued)

FOREIGN PATENT DOCUMENTS

JP S63168257 U1 11/1988
JP H84604 A 1/1996
(Continued)

*Primary Examiner* — Erick Solis
(74) *Attorney, Agent, or Firm* — Alleman Hall Creasman & Tuttle LLP (57) ABSTRACT

A passage through which a fluid can flow is formed in a canister. A first end of the passage includes an evaporated fuel introducing port and a purge port, and a second end of the passage includes an atmosphere release port. A first chamber and a second chamber are provided at the passage. The first chamber accommodates a first adsorbent, and the second chamber accommodates a second adsorbent, both capable of adsorbing and desorbing evaporated fuel. The passage is horizontal when the canister is mounted on the vehicle. A flow dividing plate including a plurality of communicating holes is provided in the second chamber, close to the atmosphere release port. When the canister is mounted, an area of the communicating holes per unit area on a surface of the flow dividing plate is larger at a lower side of the flow dividing plate than at an upper side.

4 Claims, 10 Drawing Sheets (52) U.S. Cl.
CPC .. *B01D 2253/102* (2013.01); *B01D 2259/402* (2013.01); *B01D 2259/4516* (2013.01); *B01D 2259/4566* (2013.01)

(58) Field of Classification Search
USPC ......................................................... 123/519
See application file for complete search history.

(56) References Cited

U.S. PATENT DOCUMENTS

| | | | |
|---|---|---|---|
| 5,599,384 A | 2/1997 | Yoshida et al. | |
| 5,632,251 A * | 5/1997 | Ishikawa | F02M 25/0854 123/519 |
| 6,321,726 B1 * | 11/2001 | Khami | F02M 25/0854 123/519 |
| 7,175,698 B2 * | 2/2007 | Matsuura | B01D 53/0415 96/134 |
| 2001/0015134 A1 * | 8/2001 | Uchino | B01D 53/0415 96/130 |
| 2005/0139068 A1 * | 6/2005 | Kim | B01D 53/0415 95/56 |
| 2005/0229787 A1 * | 10/2005 | Meiller | B01D 53/0415 96/152 |
| 2007/0144497 A1 * | 6/2007 | King | B01D 53/0415 123/519 |
| 2015/0275727 A1 * | 10/2015 | Hiltzik | B01D 53/0415 123/519 |
| 2016/0377032 A1 | 12/2016 | Kimoto et al. | |

FOREIGN PATENT DOCUMENTS

| | | |
|---|---|---|
| JP | 2003003914 A | 1/2003 |
| JP | 2014208518 A | 11/2014 |
| JP | 2015117603 A | 6/2015 |

* cited by examiner

CANISTER

TECHNICAL FIELD

The present invention relates to a canister mounted on a vehicle, such as an automobile, and configured to adsorb and desorb evaporated fuel.

BACKGROUND ART

PTL 1 discloses a canister configured to adsorb and desorb evaporated fuel. This canister is configured such that: a passage through which a fluid can flow is formed in the canister; a first end of the passage is provided with an evaporated fuel introducing port through which evaporated fuel from a fuel tank is introduced to the canister and a purge port through which the canister communicates with an intake passage of an engine; and a second end of the passage is provided with an atmosphere release port communicating with the atmosphere. Further, a first chamber and a second chamber are provided at the passage in this order from the first end side. The first chamber accommodates a first adsorbent capable of adsorbing and desorbing the evaporated fuel, and the second chamber accommodates a second adsorbent capable of adsorbing and desorbing the evaporated fuel.

In many cases, the canister is mounted on a vehicle in such a posture that the passage extends horizontally as disclosed in PTL 2 due to, for example, an in-vehicle layout.

CITATION LIST

Patent Literature

PTL 1: Japanese Laid-Open Patent Application Publication No. 2015-117603
PTL 2: Japanese Laid-Open Patent Application Publication No. 2014-208518

SUMMARY OF INVENTION

Technical Problem

The canister having configurations described in PTL 1 generally performs such purge that by utilizing, for example, negative pressure of the intake passage during an operation of the engine, fuel components adsorbed by the adsorbents in the first and second chambers are desorbed and then introduced into the intake passage.

During the purge, the fuel components adsorbed by the adsorbents of the first and second chambers move toward the intake passage by the negative pressure of the intake passage. For example, the fuel adsorbed by the second adsorbent of the second chamber moves toward the first chamber. When the engine stops, and the purge is terminated, the negative pressure of the intake passage disappears. With this, the fuel components adsorbed by (remaining in) the adsorbents in the first and second chambers do not move toward the intake passage but move to a lower side in the adsorbents by gravity.

When the purge is not being performed as above, advancing force which tries to keep a fuel component concentration uniform acts in the adsorbents of the first and second chambers. For example, when the concentration of the fuel components remaining in the second adsorbent of the second chamber becomes a certain concentration or more, the fuel components advance toward the atmosphere release port in the second adsorbent. The fuel components which have reached an end portion, close to the atmosphere release port, of the second adsorbent are released through the atmosphere release port in some cases.

An object of the present invention is to provide a canister capable of suppressing release of fuel components to the atmosphere.

Solution to Problem

A first aspect of the present invention in the present application is a canister mounted on a vehicle and configured to adsorb and desorb evaporated fuel, wherein: a passage through which a fluid flows is formed in the canister; a first end of the passage includes an evaporated fuel introducing port through which the evaporated fuel from a fuel tank is introduced into the canister and a purge port through which the canister communicates with an intake passage of an engine; a second end of the passage includes an atmosphere release port communicating with an atmosphere; a first chamber and a second chamber are provided at the passage in this order from the first end side, the first chamber accommodating a first adsorbent configured to adsorb and desorb the evaporated fuel, the second chamber accommodating a second adsorbent configured to adsorb and desorb the evaporated fuel; the passage is configured to extend substantially horizontally when the canister is mounted on the vehicle; a flow dividing plate including a plurality of communicating holes is provided at a side of the second adsorbent in the second chamber, the side being close to the atmosphere release port; and when the canister is mounted on the vehicle, an area of the communicating holes per unit area on a surface of the flow dividing plate is larger at a lower side of the flow dividing plate than at an upper side of the flow dividing plate.

A second aspect of the present invention in the present application is configured such that in the first aspect of the present invention, an air layer is provided between the flow dividing plate and an end portion of the second adsorbent, the end portion being close to the atmosphere release port.

A third aspect of the present invention in the present application is configured such that in the first or second aspect of the present invention, the second adsorbent is configured such that an evaporated fuel adsorption ability is higher at a portion, close to the atmosphere release port in an extending direction of the passage, of the second adsorbent than at a portion, far from the atmosphere release port in the extending direction of the passage, of the second adsorbent.

Advantageous Effects of Invention

According to the first aspect of the present invention in the present application, the flow dividing plate including the plurality of communicating holes is provided at the side, close to the atmosphere release port, of the second adsorbent in the second chamber, and when the canister is mounted on the vehicle, the area of the communicating holes per unit area on the surface of the flow dividing plate is larger at the lower side of the flow dividing plate than at the upper side of the flow dividing plate. Therefore, ventilation resistance is relatively lower at the lower side of the second chamber than at the upper side of the second chamber. On this account, the evaporated fuel adsorbed by the second adsorbent accommodated in the second chamber is more easily desorbed at the lower side during the purge, and the amount of evaporated fuel remaining is smaller at the lower side. To be specific, the fuel component concentration in the second adsorbent is lower at the lower side by the purge. It should be noted that the wording "the passage is configured to extend substantially horizontally" in the first aspect of the present invention includes, for example, a case where a tilt angle of a tube axis of the passage with respect to a horizontal plane is between −30° and +30°.

With this, even when the fuel components adsorbed by the upper side of the second adsorbent move to the lower side by gravity during the stop of the engine, the lower side of the second adsorbent has an enough adsorption capacity, so that the fuel components moving toward the lower side can be adsorbed by the lower side of the second adsorbent. Therefore, as compared to conventional cases, it is possible to delay the start of the advancement of the fuel components in the second adsorbent toward the atmosphere release port. With this, a time from when the engine stops until when the fuel components reach the end portion, close to the atmosphere release port, of the adsorbent is increased. Therefore, the release of the fuel components to the atmosphere is suppressed.

According to the second aspect of the present invention in the present application, the air layer is provided between the flow dividing plate and the end portion, close to the atmosphere release port, of the second adsorbent. With this, even when the flow dividing plate is provided, the deterioration of the use efficiency of the second adsorbent can be suppressed. To be specific, if the air layer is not provided between the flow dividing plate and the end portion, close to the atmosphere release port, of the second adsorbent, the air flowing from the atmosphere release port does not adequately flow into the second adsorbent contacting portions other than the communicating holes of the flow dividing plate. As a result, there is a possibility that the use efficiency of the second adsorbent deteriorates. However, according to the present invention, the air layer is provided between the flow dividing plate and the end portion, close to the atmosphere release port, of the second adsorbent. Therefore, the air flowing from the atmosphere release port easily flows into the second adsorbent through the end portion, close to the atmosphere release port, of the second adsorbent. On this account, even when the flow dividing plate is provided, the deterioration of the use efficiency of the second adsorbent can be suppressed.

According to the third aspect of the present invention in the present application, the second adsorbent is configured such that the evaporated fuel adsorption ability is higher at the portion, close to the atmosphere release port in the extending direction of the passage, of the second adsorbent than at the portion, far from the atmosphere release port in the extending direction of the passage, of the second adsorbent. With this, the advancement of the remaining fuel components toward the atmosphere release port in the second adsorbent by capillarity becomes slower as the remaining fuel components get close to the atmosphere release port. Therefore, the time from when the engine stops until when the fuel components reach the end portion, close to the atmosphere release port, of the second adsorbent can be further increased. Thus, the release of the fuel components to the atmosphere can be suppressed more satisfactorily.

DESCRIPTION OF EMBODIMENTS

Hereinafter, embodiments of the present invention will be explained.

Embodiment 1

Figure 1:
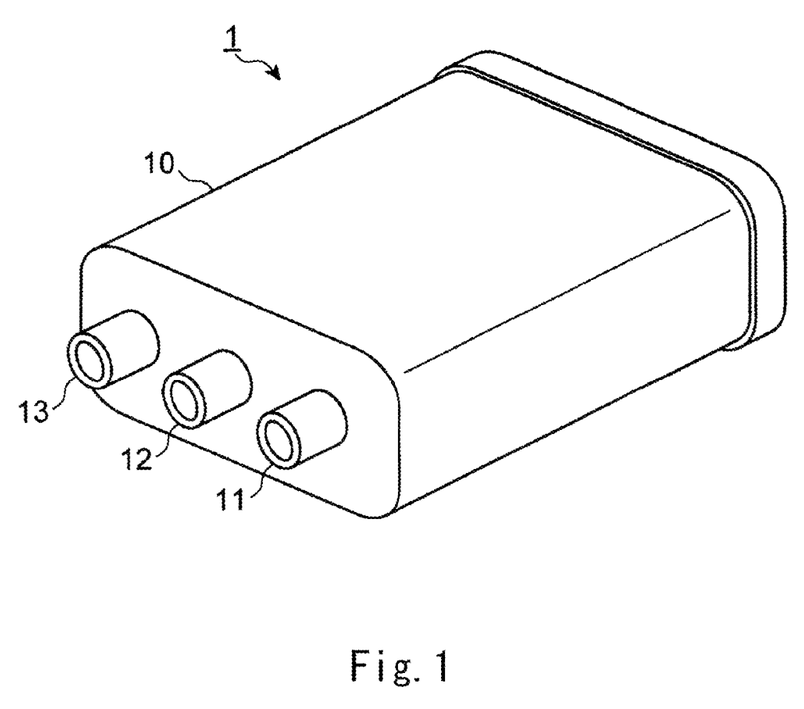
FIG. 1 is a perspective view showing an appearance of a canister of Embodiment 1 of the present invention.

A canister 1 of Embodiment 1 of the present invention will be explained. FIG. 1 is a perspective view showing an appearance of the canister of Embodiment 1 of the present invention. As shown in FIG. 1, the canister 1 includes a casing 10. The casing 10 has a bottomed tubular shape. An evaporated fuel introducing port 11, a purge port 12, and an atmosphere release port 13 are formed on a bottom wall of the casing 10, the bottom wall being located at a first end side in a tube axis direction. A passage through which a fluid can flow is formed in the canister 1 as will be described later in detail. A first end of the passage is provided with the evaporated fuel introducing port 11 and the purge port 12, and a second end of the passage is provided with the atmosphere release port 13 communicating with the atmosphere. Further, a first chamber and a second chamber are provided at the passage in this order from the first end side. The first chamber accommodates a first adsorbent capable of adsorbing and desorbing evaporated fuel, and the second chamber accommodates a second adsorbent capable of adsorbing and desorbing the evaporated fuel. In other words, the first chamber and the second chamber constitute a part of the entire passage of the canister 1. An extending direction of the passage in each of the first and second chambers substantially coincides with the tube axis direction.

Figure 2:
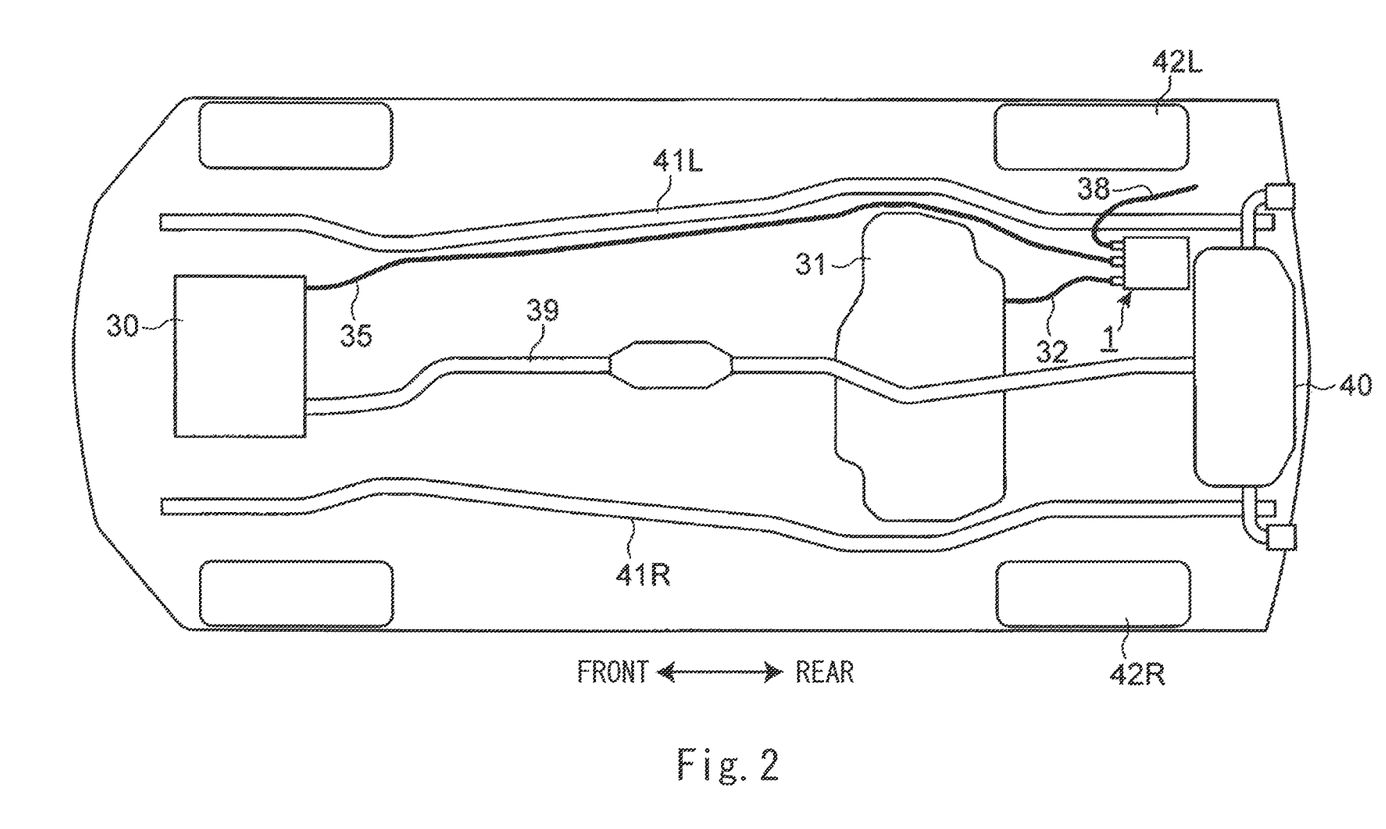
FIG. 2 is a bottom view of a vehicle on which the canister of Embodiment 1 of the present invention is mounted.
Figure 3:
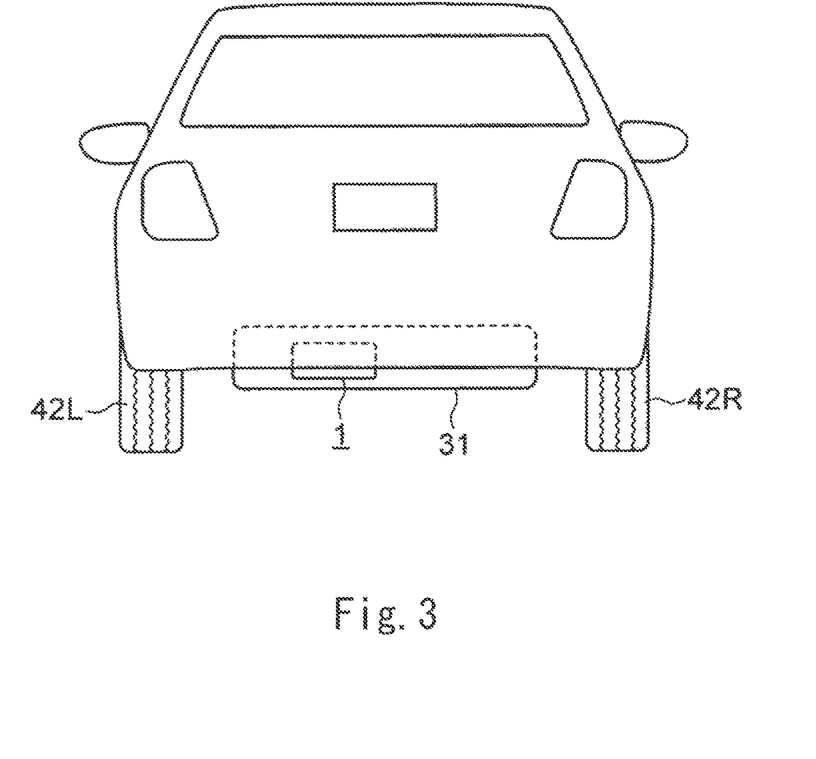
FIG. 3 is a rear view of the vehicle on which the canister of Embodiment 1 of the present invention is mounted.

The canister 1 according to the present embodiment is mounted on a vehicle, such as an automobile. FIG. 2 is a bottom view of the vehicle on which the canister 1 of Embodiment 1 of the present invention is mounted. FIG. 3 is a rear view of the vehicle on which the canister 1 of Embodiment 1 of the present invention is mounted. As shown in FIG. 2, a pair of left and right side frames 41L and 41R extend from a front portion of the vehicle to a rear portion of the vehicle at respective left and right side portions of the vehicle. An engine 30 is mounted between the left and right side frames 41L and 41R at the front portion of the vehicle. An exhaust pipe 39 extends from the engine 30 to the rear portion of the vehicle and is connected to a silencer 40. A fuel tank 31 is arranged at the rear portion of the vehicle and at a lower surface side of a floor panel. The canister 1 is arranged behind the fuel tank 31, in the vicinity of a front portion of the silencer 40, and at a vehicle width direction inner side of the left side frame 41L. The canister 1 is arranged in the vicinity of the front portion of the silencer 40 for the purpose of: warming up the canister 1 by the silencer 40; and facilitating introduction of warmed air by the canister 1. The canister 1 is arranged horizontally such that the tube axis direction extends substantially horizontally. Further, as shown in FIGS. 2 and 3, the canister 1 is arranged at a position substantially the same in height as the fuel tank 31 so as to utilize a space under the floor panel. A purge passage 35 connecting the engine 30 (an intake passage 34 of the engine 30) and the purge port 12 of the canister 1 extends along the left side frame 41L in a vehicle forward/rearward direction. An evaporated fuel introducing passage 32 connecting the fuel tank 31 and the evaporated fuel introducing port 11 of the canister 1 extends between the fuel tank 31 and the evaporated fuel introducing port 11 in the forward/rearward direction. An atmosphere release pipe 38 connected to the atmosphere release port 13 of the canister 1 extends to a space located in a rear fender and behind a left rear wheel 42L out of left and right rear wheels 42L and 42R.

FIG. 3 is a rear view of the vehicle on which the canister 1 of Embodiment 1 of the present invention is mounted. The canister 1 is arranged at a position substantially the same in height as the fuel tank 31 so as to effectively utilize a space under the floor panel.

Figure 4:
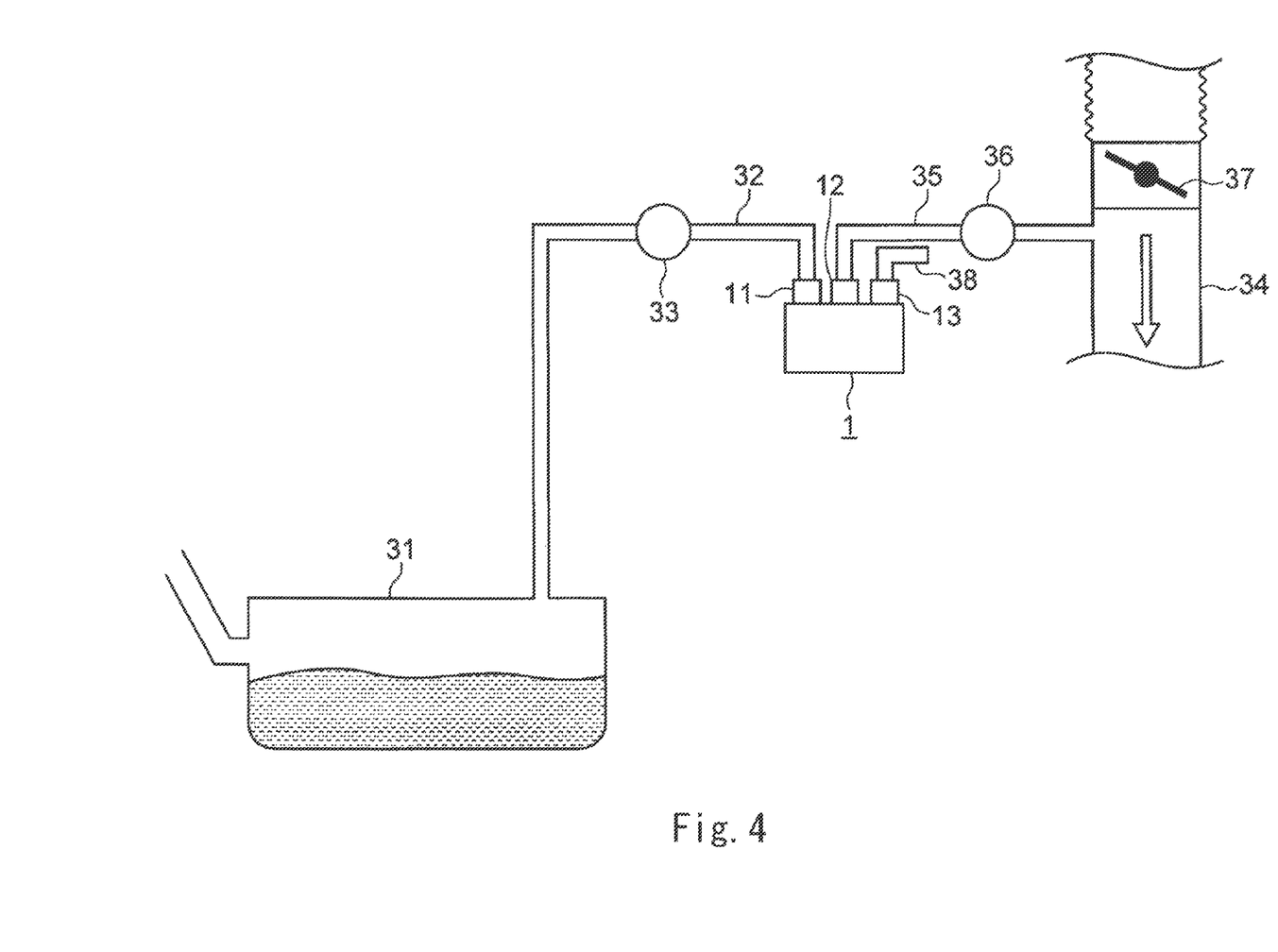
FIG. 4 is a schematic configuration diagram of an evaporated fuel processing system including the canister of Embodiment 1 of the present invention.

FIG. 4 is a schematic configuration diagram of an evaporated fuel processing system including the canister 1 of Embodiment 1 of the present invention. The evaporated fuel processing system is a system configured to process the evaporated fuel generated in the fuel tank 31. An evaporated fuel gas containing the evaporated fuel generated in the fuel tank 31 is introduced into the canister 1 through the evaporated fuel introducing passage 32 and the evaporated fuel introducing port 11, and the introduced evaporated fuel is adsorbed by the adsorbents in the canister 1. The purge port 12 is connected to the intake passage 34 of the engine 30 through the purge passage 35. When pressure in the intake passage 34 becomes negative pressure by opening/closing operations of a throttle valve 37 during an operation of the engine 30, air is introduced into the canister 1 through the atmosphere release port 13. With this, fuel components which have been adsorbed by the adsorbents are desorbed, and the desorbed fuel components are introduced into a combustion chamber of the engine 30 through the intake passage 34 and utilized as combustion fuel. The amount of evaporated fuel introduced into the intake passage 34 by the purge can be controlled by controlling an opening degree of a purge valve 36. Further, the amount of evaporated fuel introduced into the canister 1 can be controlled by controlling an opening degree of an evaporated fuel introducing valve 33. The opening degrees of these valves are controlled by an engine controller (ECU (not shown)), not shown, based on, for example, an operation state of the engine 30.

Figure 5:
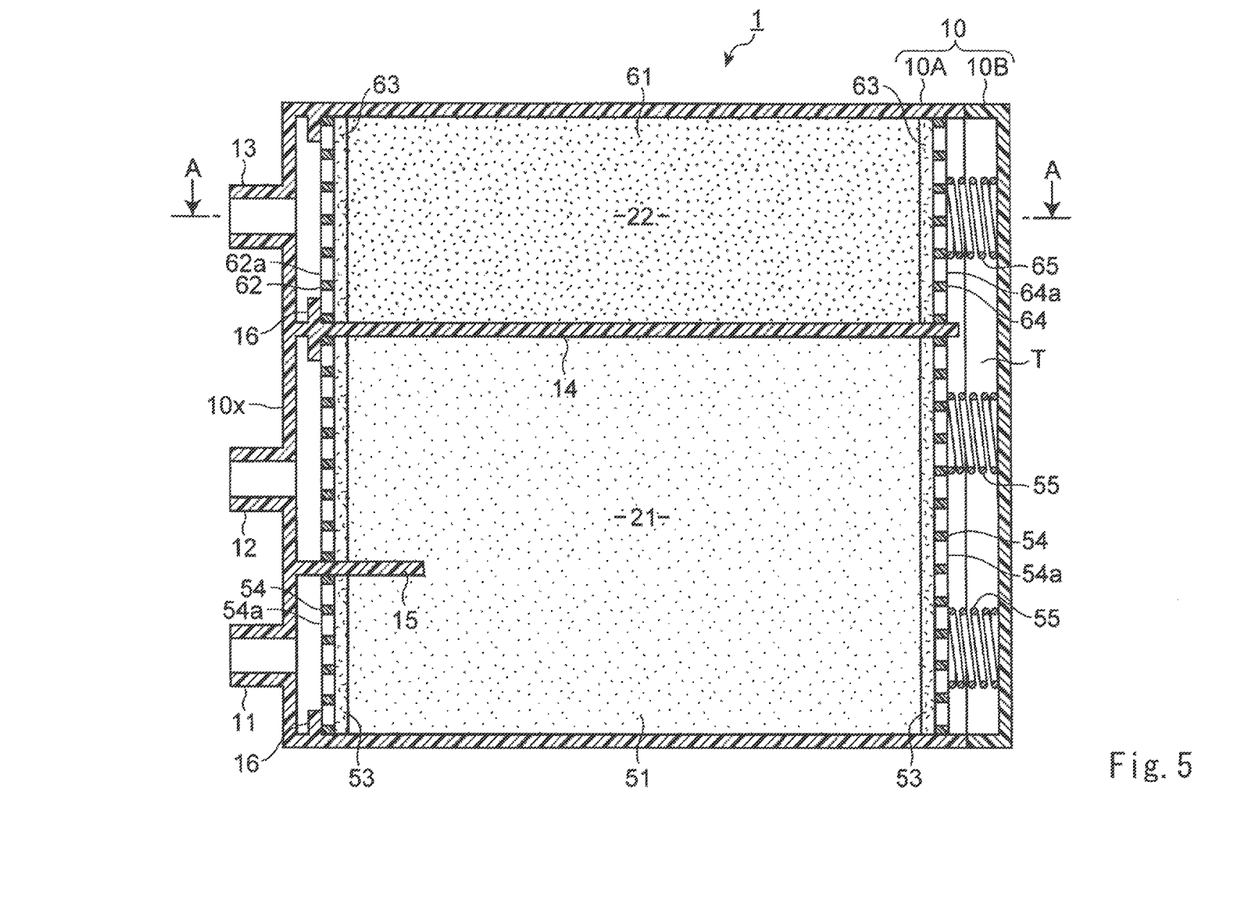
FIG. 5 is a sectional view of the canister of Embodiment 1 of the present invention.

FIG. 5 is a sectional view of the canister 1 of Embodiment 1 of the present invention. As shown in FIG. 5, the canister 1 includes the casing 10. The casing 10 includes a bottomed tubular casing main body 10A and a lid 10B configured to close an opening end surface of the casing main body 10A.

The evaporated fuel introducing port 11, the atmosphere release port 13, and the purge port 12 are formed at a canister outer side of a bottom plate 10x of the casing main body 10A.

First and second partition walls 14 and 15 projecting in the tube axis direction in a space of the casing main body 10A are formed at a canister inner side of the bottom plate 10x located at a front portion of the casing main body 10A. A tip end portion of the first partition wall 14 extends to the vicinity of the lid 10B. The first partition wall 14 divides an inside of the casing main body 10A into a first chamber 21 communicating with the purge port 12 and the evaporated fuel introducing port 11 and a second chamber 22 communicating with the atmosphere release port 13. A projection amount of the second partition wall 15 is smaller than a projection amount of the first partition wall 14. The first partition wall 14 divides a space of the first chamber 21, which space is located at the first end side in the tube axis direction, into two spaces that are a space close to the evaporated fuel introducing port 11 and a space close to the purge port 12.

The first chamber 21 accommodates a ventilation plate 54, a filter plate 53, a first adsorbent 51, a filter plate 53, and a ventilation plate 54 in this order from a side close to the bottom plate 10x of the casing main body 10A. A stopper 16 projecting toward an inner side of the first chamber 21 in the vicinity of the bottom plate 10x of the casing main body 10A is formed on a tubular wall of the casing main body 10A and the first partition wall 14, and springs 55 are interposed between the ventilation plate 54 and the lid 10B of the casing 10. The springs 55 press a flow dividing plate 62, the filter plate 53, the first adsorbent 51, the filter plate 53, and the ventilation plate 54 toward the stopper 16. Therefore, regarding the ventilation plates 54, the filter plates 53, and the first adsorbent 51, adjacent members press against each other, so that any gap is not formed between the members or between the first adsorbent 51 and the casing 10. According to the above configuration, by inserting the above members into the first chamber 21 in the above order through an opening of the casing main body 10A, this structure can be easily realized.

The first adsorbent 51 adsorbs and desorbs the evaporated fuel generated in the fuel tank 31. For example, activated carbon capable of adsorbing and desorbing the evaporated fuel can be utilized as the first adsorbent 51. For example, used as the activated carbon for the first adsorbent 51 is activated carbon having a pellet shape (for example, having a diameter of 2 mm and an axial length of 4 mm), a peak of a distribution of volumes of pore sizes of the activated carbon being around 5 nm.

The filter plate 53 is formed by, for example, non-woven fabric. The filter plate 53 prevents the activated carbon, finely crushed by vibrations and the like, from getting into the passages through the ports.

The ventilation plate 54 is, for example, a latticed plate member including a large number of through holes 54a. The ventilation plate 54 is formed by, for example, resin.

A space is provided between the ventilation plate 54 of the first chamber 21 and the lid 10B, and a space is provided between the ventilation plate 64 of the second chamber 22 and the lid 10B. A gap is provided between the lid 10B and an end portion of the first partition wall 14, the end portion being close to the lid 10B. These spaces and gap constitute a communicating portion T through which the first chamber 21 and the second chamber 22 communicate with each other.

The second chamber 22 accommodates a flow dividing plate 62, a filter plate 63, a second adsorbent 61, a filter plate 63, and a ventilation plate 64 in this order from the side close to the bottom plate 10x of the casing main body 10A. A stopper 16 projecting toward an inner side of the second chamber 22 in the vicinity of the bottom plate 10x of the casing main body 10A is formed on the tubular wall of the casing main body 10A and the first partition wall 14, and a spring 65 is interposed between the ventilation plate 64 and the lid 10B of the casing 10. The spring 65 presses the ventilation plate 64 toward the stopper 16. Therefore, regarding the ventilation plate 64, the filter plates 63, and the second adsorbent 61, adjacent members press against each other, so that any gap is not formed between the members or between the second adsorbent 61 and the casing 10. According to the above configuration, by inserting the above members into the second chamber 22 in the above order through the opening of the casing main body 10A, this structure can be easily realized.

The second adsorbent 61 adsorbs and desorbs the evaporated fuel generated in the fuel tank 31. For example, activated carbon capable of adsorbing and desorbing the evaporated fuel can be utilized as the second adsorbent 61. More specifically, utilized as the second adsorbent 61 is the activated carbon which is lower in adsorption ability but higher in desorption performance than the first adsorbent 51. This is because: the second adsorbent 61 needs to adsorb fuel, and at the same time, easily desorb the adsorbed fuel component during the purge; whereas the first adsorbent 51 needs to adsorb fuel as much as possible, and at the same time, hold the adsorbed fuel and prevents the movement of the fuel toward the second chamber 22 as much as possible.

For example, used as the activated carbon for the second adsorbent 61 is activated carbon having a pellet shape having a larger particle diameter than the first adsorbent 51 or a monolith shape, a peak of a distribution of volumes of pore sizes of the activated carbon being around 1,000 nm.

The filter plate 63 is formed by, for example, non-woven fabric. The filter plate 63 prevents the activated carbon, finely crushed by vibrations and the like, from getting into the passages through the ports.

The ventilation plate 64 is, for example, a latticed plate member including a large number of through holes 64a. The ventilation plate 64 is formed by, for example, resin.

Figure 6:
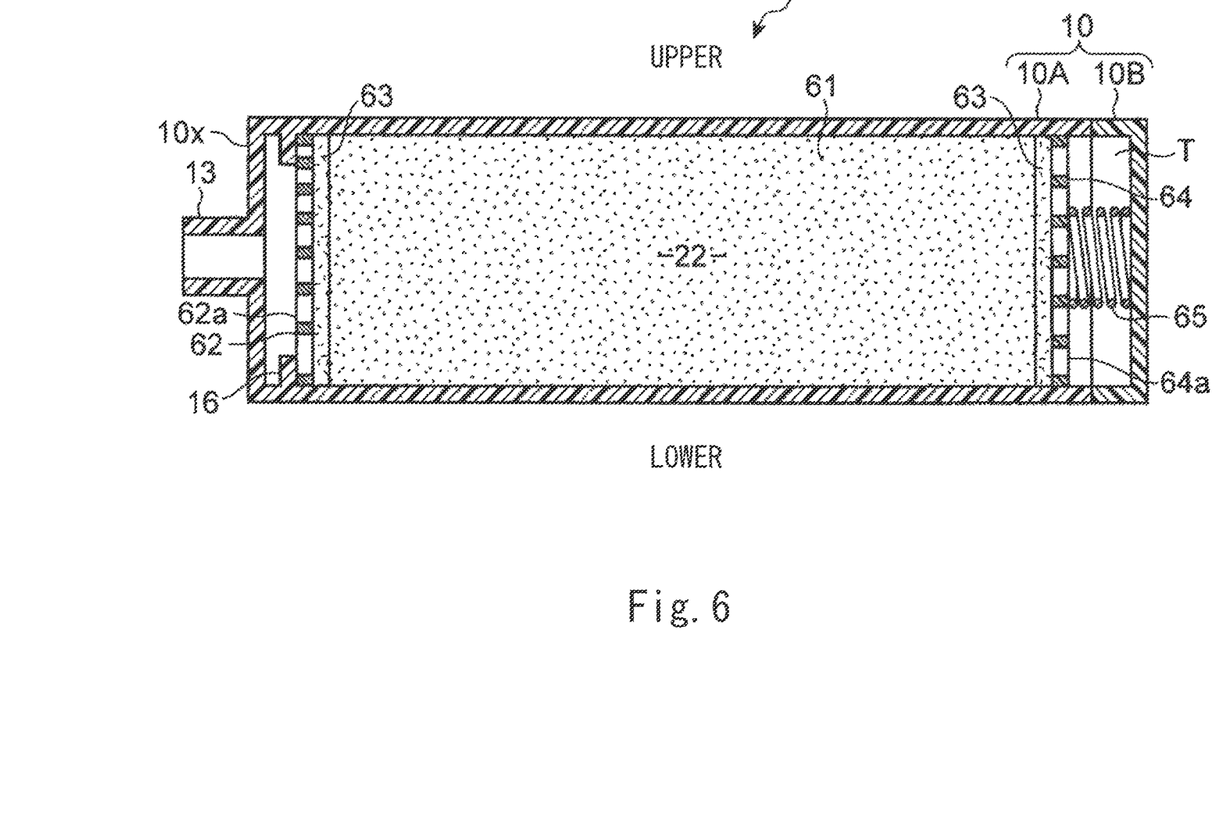
FIG. 6 is a sectional view taken along line A-A of FIG. 5.
Figure 7:
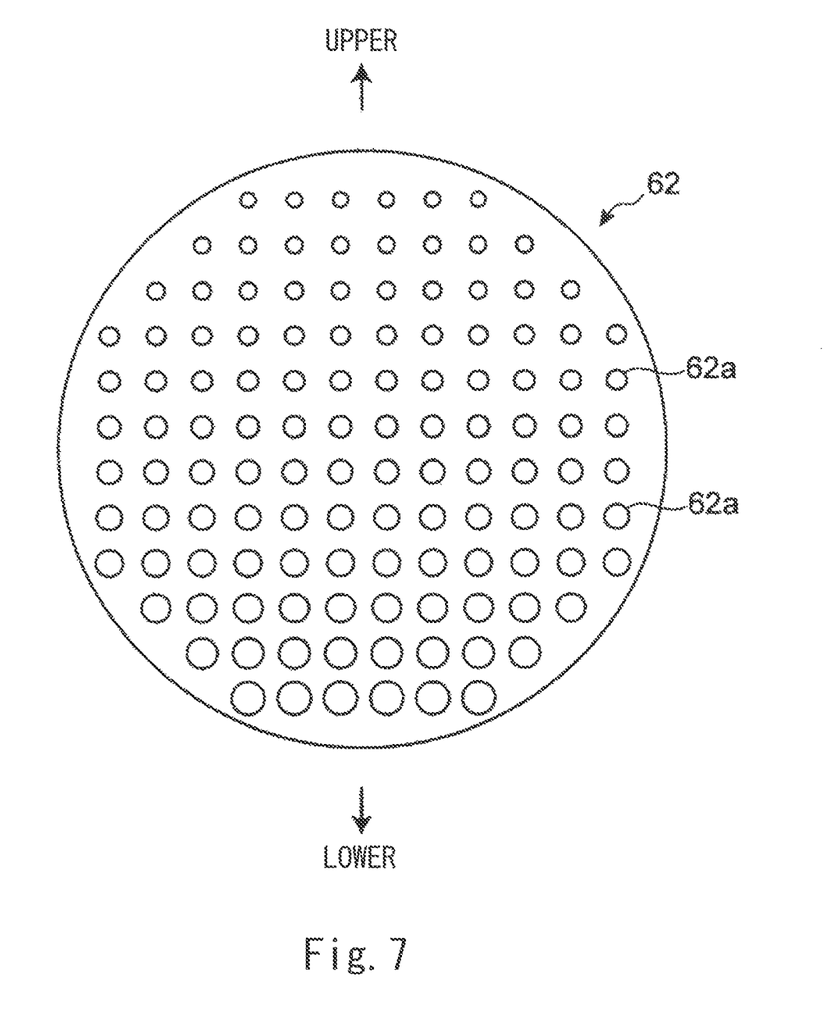
FIG. 7 is a front view of a flow dividing plate of the canister of Embodiment 1 of the present invention (i.e., an arrow view based on an arrow B of FIG. 5).

FIG. 6 is a sectional view taken along line A-A of FIG. 5. FIG. 7 is a front view of the flow dividing plate 62 of the canister 1 of Embodiment 1 of the present invention. The flow dividing plate 62 is formed by, for example, resin and includes a plurality of communicating holes 62a. A fluid can flow through the communicating holes 62a of the flow dividing plate 62. The plurality of communicating holes 62a of the flow dividing plate 62 are formed such that when the canister 1 is mounted on the vehicle, an area of the communicating holes per unit area on the surface of the flow dividing plate 62 is larger at a lower side of the flow dividing plate 62 than at an upper side of the flow dividing plate 62. In the example of FIG. 7, the communicating holes 62a are formed at regular intervals in an upward/downward direction and a leftward/rightward direction, and the diameters of the communicating holes 62a are larger at the lower side of the flow dividing plate 62 than at the upper side of the flow dividing plate 62. With this, the area of the communicating holes per unit area on the surface of the flow dividing plate 62 is larger at the lower side of the flow dividing plate 62 than at the upper side of the flow dividing plate 62. For example, when the area at the upper side is set to 1, the area at the lower side is set to about 1.5 to 3. If an area ratio is excessively increased, a difference between flow velocities at the upper and lower sides becomes large, and there is a possibility that the desorption of the second adsorbent 61 is not adequately performed at the upper side where the flow velocity is low.

It should be noted that the shape of each communicating hole 62a of the flow dividing plate 62 in FIG. 6 is a circular shape. However, the shape of each communicating hole 62a of the flow dividing plate 62 does not have to be a circular shape and may be a triangular shape, a quadrangular shape, a pentagonal shape, an oval shape, or any other shape as long as the area of the communicating holes per unit area on the surface of the flow dividing plate 62 is larger at the lower side of the flow dividing plate 62 than at the upper side of the flow dividing plate 62.

Further, the flow dividing plate 62 is provided only at a side of the second adsorbent 61 in the second chamber 22, the side being close to the atmosphere release port 13. However, in the present invention, the flow dividing plate 62 may also be provided at a side of the second adsorbent 61, the side being far from the atmosphere release port 13. In this case, for example, a flow dividing plate 62 equivalent to the flow dividing plate 62 located at the side close to the atmosphere release port 13 may be provided instead of the ventilation plate 64 located at the side, far from the atmosphere release port 13, of the second adsorbent 61.

It should be noted that it is unnecessary to provide a flow dividing plate in the first chamber 21. The flow dividing plate deflects the flow of the fluid. Therefore, if the flow dividing plate is provided in the first chamber 21, there is a possibility that the flow dividing plate influences the flow of the fluid toward two ports that are the evaporated fuel introducing port 11 and the purge port 12.

The filter plate 63 formed by the non-woven fabric is provided between the flow dividing plate 62 and an end portion of the second adsorbent 61, the end portion being close to the atmosphere release port 13. The filter plate 63 serves as an air layer through which a fluid can flow.

Actions

Actions of the canister 1 of the present embodiment will be explained. For example, during fueling or parking, the evaporated fuel gas containing the evaporated fuel generated by the evaporation of the fuel in the fuel tank 31 is introduced into the canister 1 through the evaporated fuel introducing port 11 by an increase in internal pressure of the fuel tank 31. Then, the fuel components are adsorbed by the activated carbon of the first chamber 21 and the activated carbon of the second chamber 22. The gas from which the fuel components have been mostly removed is released to the atmosphere through the atmosphere release port 13.

When the first adsorbent 51 continuously adsorbs the evaporated fuel gas, and a fuel component concentration in the first adsorbent 51 increases to become a certain value or more, the evaporated fuel gas advances into the communicating portion T. Further, when the fuel component concentration in the communicating portion T increases to become a certain value or more, the second adsorbent 61 in the second chamber 22 adsorbs the fuel component from the side, far from the atmosphere release port 13, of the second adsorbent 61. When the fuel component concentration in the end portion, close to the atmosphere release port 13, of the second adsorbent 61 increases to become a certain value or more, there is a possibility that the fuel components are released to the atmosphere through the atmosphere release port 13. It should be noted that when the operation of the engine 30 is performed, and the purge is performed, the fuel components are gradually desorbed from the side, close to the atmosphere release port 13, of the second adsorbent 61.

Specifically, for example, when the purge valve 36 is opened by the ECU (not shown) or a pressure difference during the operation of the engine 30, air in the atmosphere is introduced by intake negative pressure of the engine 30 into the second chamber 22 and the first chamber 21 in the canister 1 through the atmosphere release port 13. At this time, the evaporated fuel is desorbed (purged) from the first adsorbent 51 of the first chamber 21 and the second adsorbent 61 of the second chamber 22 and supplied to the intake passage 34 of the engine 30 through the purge port 12 together with air.

Figure 8:
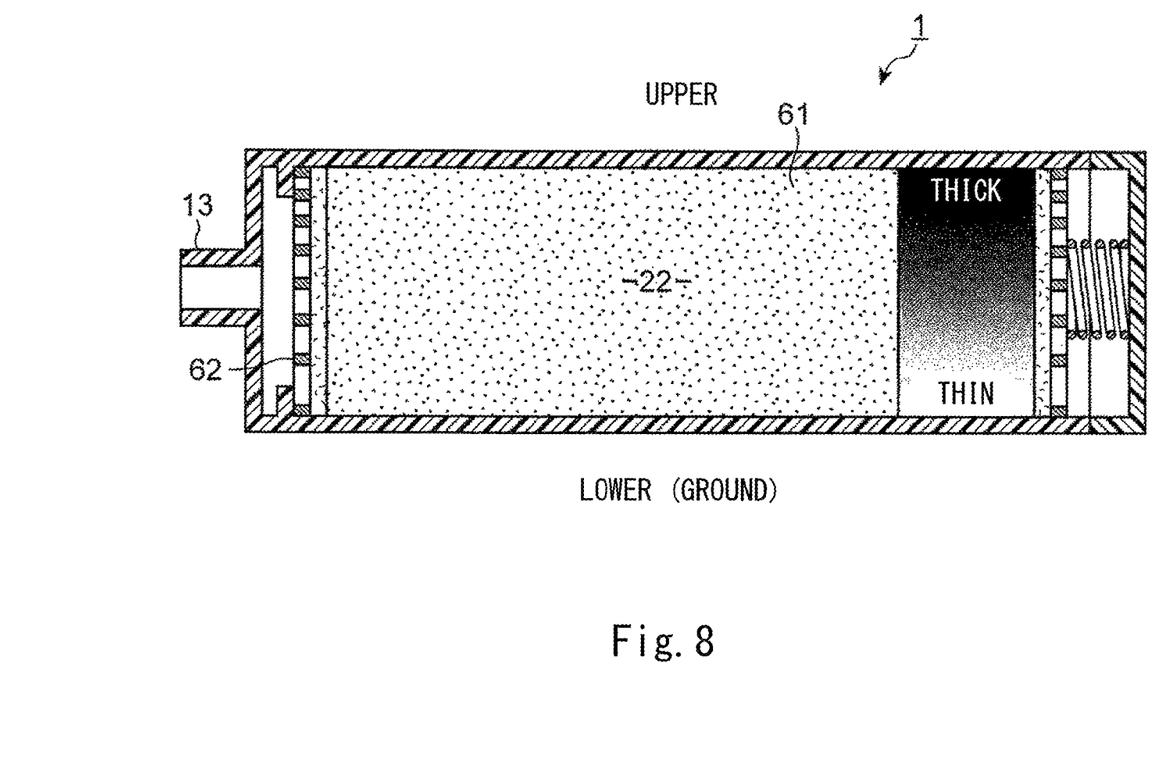
FIG. 8 is a diagram for explaining actions of the canister of Embodiment 1 of the present invention.

In this case, in the present embodiment, the flow dividing plate 62 including the plurality of communicating holes 62a is provided at a side of the second adsorbent 61 of the second chamber 22, the side being close to the purge port 12. The plurality of communicating holes 62a are formed such that when the canister 1 is mounted on the vehicle, the area of the communicating holes per unit area on the surface of the flow dividing plate 62 is larger at the lower side of the flow dividing plate 62 than at the upper side of the flow dividing plate 62. Therefore, ventilation resistance is relatively lower at the lower side of the second chamber 22 than at the upper side of the second chamber 22. On this account, the evaporated fuel adsorbed by the second adsorbent 61 accommodated in the second chamber 22 is more easily desorbed at the lower side during the purge, and the amount of evaporated fuel remaining is smaller at the lower side. To be specific, as shown in FIG. 8, the fuel component concentration in the second adsorbent 61 is lower at the lower side by the purge.

With this, even when the fuel components adsorbed by the upper side of the second adsorbent 61 move to the lower side by gravity during the stop of the engine 30, the lower side of the second adsorbent 61 has an enough adsorption capacity, so that the fuel components moving toward the lower side can be adsorbed by the lower side of the second adsorbent 61. Therefore, as compared to conventional cases, it is possible to delay the start of the advancement of the fuel components in the second adsorbent 61 toward the atmosphere release port 13. With this, a time from when the engine 30 stops until when the fuel components reach the end portion, close to the atmosphere release port 13, of the second adsorbent 61 is increased. Therefore, the release of the fuel components to the atmosphere is suppressed.

It should be noted that in the present embodiment, the air layer (i.e., the filter plate 63 made of the non-woven fabric) is provided between the flow dividing plate 62 and the end portion, close to the atmosphere release port 13, of the second adsorbent 61. Therefore, the air flowing from the atmosphere release port 13 easily flows into the second adsorbent 61 through the end portion, close to the atmosphere release port 13, of the second adsorbent 61. On this account, even when the flow dividing plate 62 is provided, the deterioration of the use efficiency of the second adsorbent 61 can be suppressed. If the air layer (i.e., the filter plate 63 made of the non-woven fabric) is not provided between the flow dividing plate 62 and the end portion, close to the atmosphere release port 13, of the second adsorbent 61, the air flowing from the atmosphere release port 13 does not adequately flow into the second adsorbent 61 contacting portions other than the communicating holes 62a of the flow dividing plate 62. As a result, there is a possibility that the use efficiency of the second adsorbent 61 deteriorates.

Embodiment 2

The canister 1 of Embodiment 2 of the present invention will be explained. In Embodiment 2, the same drawings as Embodiment 1 are used. In Embodiment 2, the second adsorbent 61 is configured such that the evaporated fuel adsorption ability is higher at the portion close to the atmosphere release port 13 in the extending direction of the passage than at the portion far from the atmosphere release port 13 in the extending direction of the passage. If the adsorption ability of the entire second adsorbent 61 is increased evenly, the amount of fuel components remaining at the portion, far from the atmosphere release port 13, of the second adsorbent at the time of the termination of the purge becomes large, and the time from when the engine stops until when the fuel components reach the end portion close to the atmosphere release port 13 is decreased. Therefore, the adsorption ability at the potion, far from the atmosphere release port 13, of the second adsorbent 61 is set to be lower than the adsorption ability at the potion, close to the atmosphere release port 13, of the second adsorbent 61.

The evaporated fuel adsorption ability is generally represented by butane working capacity (BWC). In the present embodiment, the second adsorbent 61 is configured such that the butane working capacity (BWC) becomes larger in value at the portion close to the atmosphere release port 13 in the extending direction of the passage than at the portion far from the atmosphere release port 13 in the extending direction of the passage.

It should be noted that an adsorbent having large BWC denotes activated carbon used as the adsorbent and having high pore density per unit volume. For example, when forming the second adsorbent 61, pellets having larger particle diameters than pellets laid at the portion close to the atmosphere release port 13 may be laid at the portion far from the atmosphere release port 13.

The portion, close to the atmosphere release port 13, of the second adsorbent 61 needs to have high adsorption ability, and in addition, has to be able to surely perform desorption when carrying out the purge. Therefore, it is preferable to set the adsorption ability in consideration of balance with the desorption performance at the time of the purge.

According to this configuration, the advancement of the remaining fuel components toward the atmosphere release port 13 in the second adsorbent 61 by capillarity becomes slower as the remaining fuel components get close to the atmosphere release port 13. Therefore, the time from when the engine 30 stops until when the fuel components reach the end portion, close to the atmosphere release port 13, of the second adsorbent 61 can be further increased. Thus, the release of the fuel components to the atmosphere can be suppressed more satisfactorily.

Embodiment 3

Figure 9:
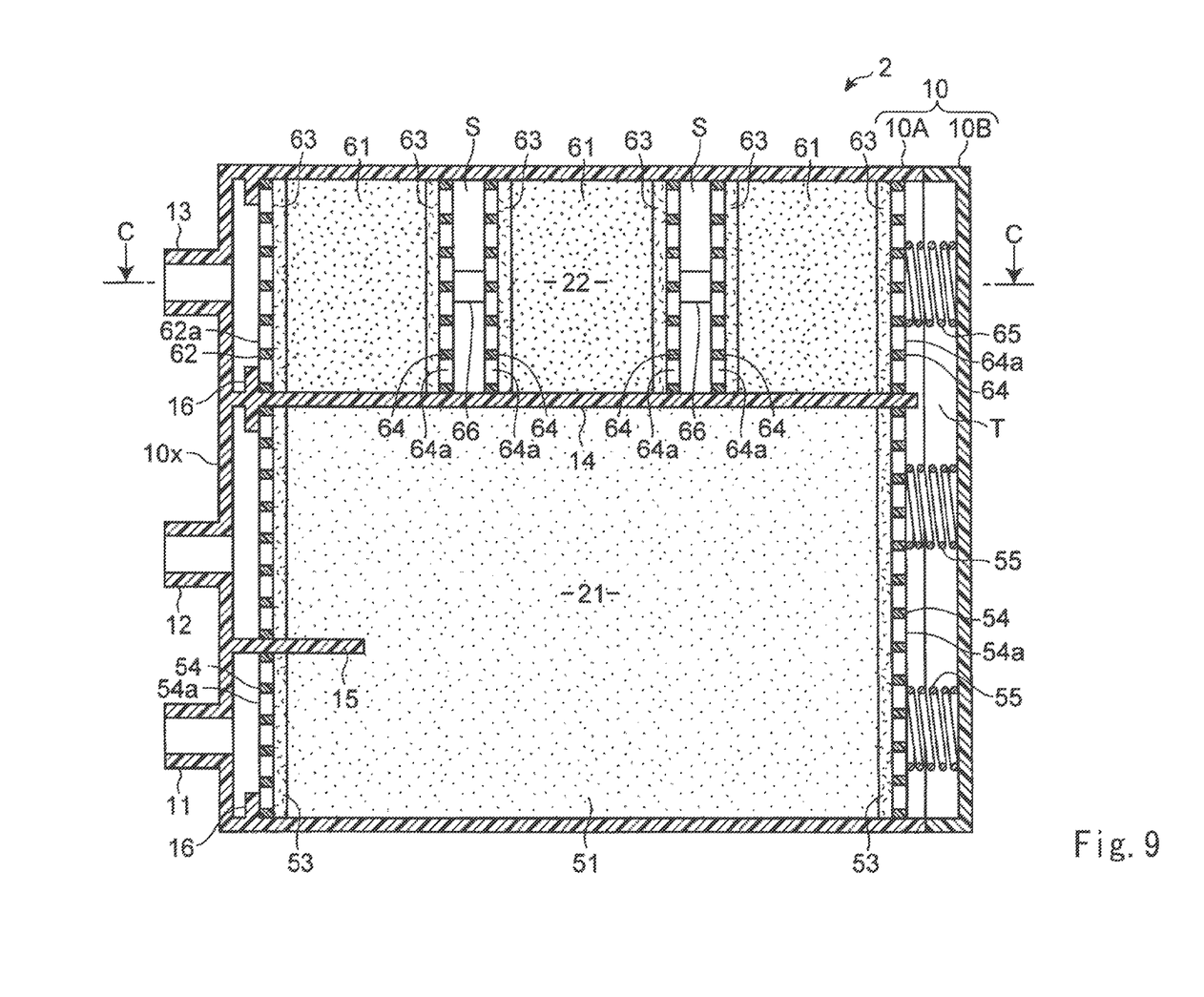
FIG. 9 is a sectional view of the canister of Embodiment 2 of the present invention.
Figure 10:
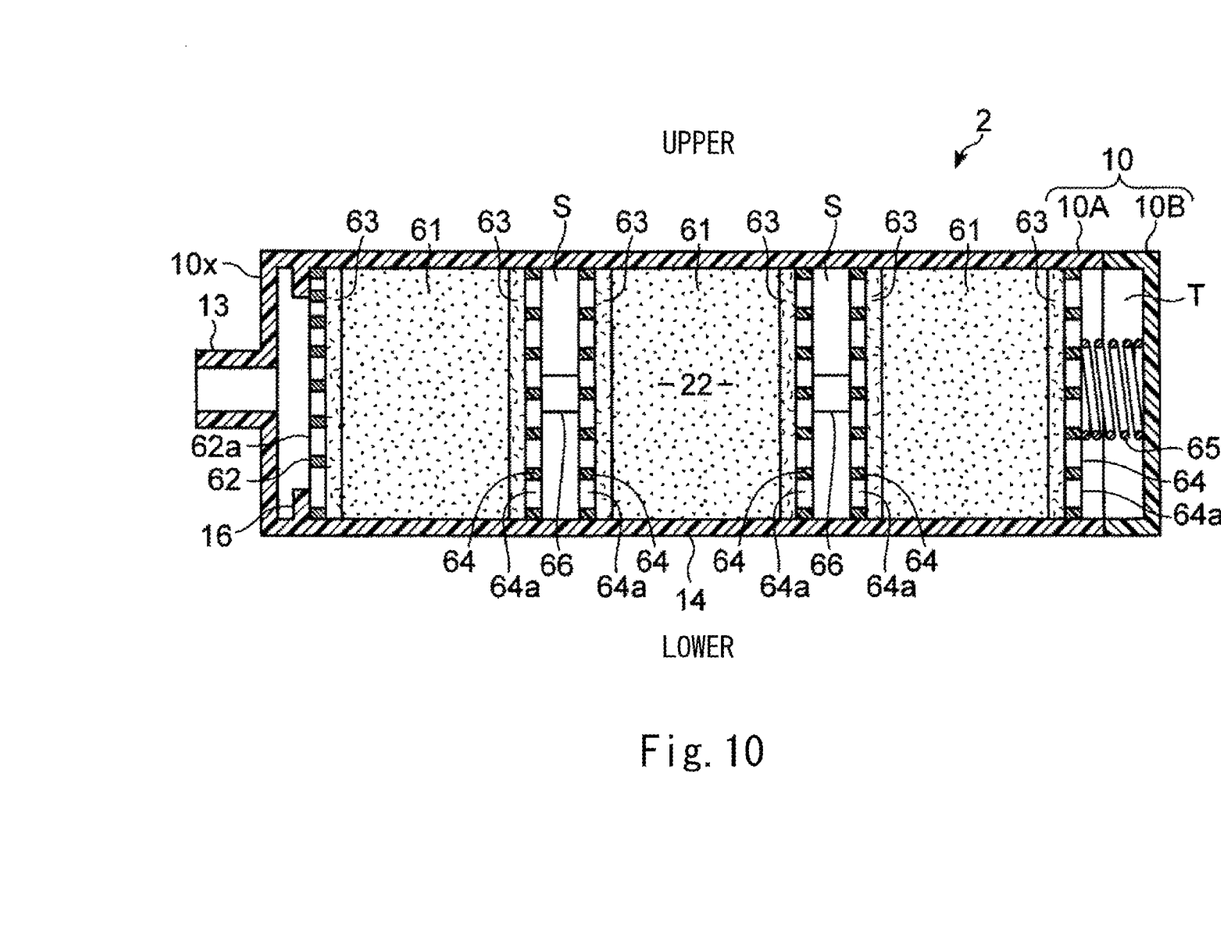
FIG. 10 is a sectional view taken along line C-C of FIG. 9.

The canister 1 of Embodiment 3 of the present invention will be explained. FIG. 9 is a sectional view of the canister 1 of Embodiment 3 of the present invention. FIG. 10 is a sectional view taken along line C-C of FIG. 9. In the canister 1 of Embodiment 3, the second chamber 22 accommodates a plurality of second adsorbents 61. In the second chamber 22, the second adsorbents 61 and space portions S are alternately arranged in the extending direction of the passage.

Specifically, the second chamber 22 accommodates the flow dividing plate 62, the filter plate 63, the second adsorbent 61, the filter plate 63, the ventilation plate 64, a space forming member 66, the ventilation plate 64, the filter plate 63, the second adsorbent 61, the filter plate 63, the ventilation plate 64, a space forming member 66, the ventilation plate 64, the filter plate 63, the second adsorbent 61, the filter plate 63, and the ventilation plate 64 in this order from the side close to the bottom plate 10x of the casing main body 10A (i.e., the side close to the atmosphere release port 13). A stopper 16 projecting toward an inner side of the second chamber 22 in the vicinity of the bottom plate 10x of the casing main body 10A is formed on the tubular wall of the casing main body 10A and the first partition wall 14, and a spring 65 is interposed between the ventilation plate 64 and the lid 10B of the casing 10. The spring 65 presses the ventilation plate 64 toward the stopper 16. Therefore, regarding the flow dividing plate 62, the filter plate 63, the second adsorbent 61, the filter plate 63, the ventilation plate 64, the space forming member 66, the ventilation plate 64, the filter plate 63, the second adsorbent 61, the filter plate 63, the ventilation plate 64, the space forming member 66, the ventilation plate 64, the filter plate 63, the second adsorbent 61, the filter plate 63, and the ventilation plate 64, adjacent members press against each other, so that any gap is not formed between the members. According to the above configuration, by inserting the above members into the second chamber 22 in the above order through an opening of the casing main body 10A, this structure can be easily realized.

The ventilation plate 64 and the filter plate 63 may be the same as the ventilation plate 64 and the filter plate 63 of Embodiment 1.

The space forming member 66 is interposed between the two adjacent ventilation plates 64 and forms a space between these ventilation plates 64. As with the ventilation plate 64, the space forming member 66 is formed by, for example, resin. The space forming member 66 and the adjacent ventilation plate(s) 64 may be formed integrally or may be coupled to each other by an adhesive or the like.

The second adsorbent 61 adsorbs and desorbs the evaporated fuel generated in the fuel tank 31. The second adsorbent 61 of Embodiment 2 is different in length in the tube axis direction from the second adsorbent 61 of Embodiment 1 but may be the same in composition as the second adsorbent 61 of Embodiment 1. For example, activated carbon capable of adsorbing and desorbing the evaporated fuel can be utilized as the second adsorbent 61 of Embodiment 2.

Other than the above, Embodiment 3 is the same in configuration as Embodiment 1.

According to Embodiment 3, the second chamber 22 accommodates the plurality of second adsorbents 61, and the second adsorbents 61 and the space portions S are alternately arranged in the second chamber 22 in the extending direction of the passage. With this, the remaining fuel components in each second adsorbent 61 hardly advance to the adjacent second adsorbent 61. To be specific, the remaining fuel components in the second adsorbent 61 hardly advance toward the atmosphere release port 13. With this, the time from when the engine 30 stops until when the fuel components reach the end portion, close to the atmosphere release port 13, of the second adsorbent 61 is further increased, and therefore, the release of the fuel components to the atmosphere is suppressed more satisfactorily.

Conclusion

The canister 1 of each of the embodiments includes the following configurations and features.

The canister 1 of each of Embodiments 1 to 3 is a canister 1 mounted on a vehicle and configured to adsorb and desorb evaporated fuel, wherein: a passage through which a fluid flows is formed in the canister 1; a first end of the passage includes an evaporated fuel introducing port 11 through which the evaporated fuel from a fuel tank 31 is introduced into the canister 1 and a purge port 12 through which the canister 1 communicates with an intake passage 34 of an engine 30; a second end of the passage includes an atmosphere release port 13 communicating with an atmosphere; a first chamber 21 and a second chamber 22 are provided at the passage in this order from the first end side, the first chamber 21 accommodating a first adsorbent 51 configured to adsorb and desorb the evaporated fuel, the second chamber 22 accommodating a second adsorbent 61 configured to adsorb and desorb the evaporated fuel; the passage is configured to extend substantially horizontally when the canister 1 is mounted on the vehicle; a flow dividing plate 62 including a plurality of communicating holes 62a is provided at a side of the second adsorbent 61 in the second chamber 22, the side being close to the atmosphere release port 13; and when the canister 1 is mounted on the vehicle, an area of the communicating holes per unit area on a surface of the flow dividing plate 62 is larger at a lower side of the flow dividing plate 62 than at an upper side of the flow dividing plate 62.

In each of Embodiments 1 to 3, the air layer (i.e., the filter plate 63 made of the non-woven fabric) is provided between the flow dividing plate 62 and an end portion of the second adsorbent 61, the end portion being close to the atmosphere release port 13.

In Embodiment 2, the second adsorbent 61 is configured such that an evaporated fuel adsorption ability is higher at a portion, close to the atmosphere release port 13 in an extending direction of the passage, of the second adsorbent 61 than at a portion, far from the atmosphere release port 13 in the extending direction of the passage, of the second adsorbent 61.

Other Embodiments

In the above embodiments, the flow dividing plate 62 is provided only at the side, close to the atmosphere release port 13, of the second adsorbent 61 in the second chamber 22. However, in the present invention, the flow dividing plate 62 may also be provided at the side, far from the atmosphere release port 13, of the second adsorbent 61. In this case, for example, a flow dividing plate 62 equivalent to the flow dividing plate 62 of each embodiment may be provided instead of the ventilation plate 64 located at the side, far from the atmosphere release port 13, of the second adsorbent 61.

Or, the ventilation plate 64 of the space forming member 66 may be configured as the flow dividing plate 62 similar in configuration to the flow dividing plate 62.

In the above embodiments, the shape of each communicating hole 62a of the flow dividing plate 62 is a circular shape. However, the shape of each communicating hole 62a of the flow dividing plate 62 does not have to be a circular shape and may be a triangular shape, a quadrangular shape, a pentagonal shape, an oval shape, or any other shape.

In the above embodiments, the air layer between the flow dividing plate 62 and the end portion, close to the atmosphere release port 13, of the second adsorbent 61 is constituted by the filter plate 63 made of the non-woven fabric. However, the air layer may be constituted by a space.

In Embodiment 3, three sets each including the ventilation plate 64, the second adsorbent 61, and the ventilation plate 64 are provided. However, the number of such sets may be two or four or more.

INDUSTRIAL APPLICABILITY

The canister of the present invention may be widely utilized as a canister mounted on a vehicle, such as an automobile, and configured to adsorb and desorb evaporated fuel.

LIST OF REFERENCE CHARACTERS 1 canister
10 casing
10A casing main body
10B lid
10x bottom plate
11 evaporated fuel introducing port
12 purge port
13 atmosphere release port
14 partition wall
15 partition wall
16 stopper
21 first chamber
22 second chamber
30 engine
31 fuel tank
32 evaporated fuel introducing passage
33 evaporated fuel introducing valve
34 intake passage
35 purge passage
36 purge valve
37 throttle valve
38 atmosphere release pipe
39 exhaust pipe
40 silencer
41L left side frame
41R right side frame
42L left rear wheel
42R right rear wheel
51 first adsorbent
53 filter plate
54 ventilation plate
54a through hole
55 spring
61 second adsorbent
62 flow dividing plate
62a communicating hole
63 filter plate
64 ventilation plate
64a through hole
65 spring
66 space forming member
S space portion
T communicating portion

The invention claimed is:

1. A canister mounted on a vehicle and configured to adsorb and desorb evaporated fuel, wherein:
a passage through which a fluid flows is formed in the canister;
a first end of the passage includes
an evaporated fuel introducing port through which the evaporated fuel from a fuel tank is introduced into the canister and
a purge port through which the canister communicates with an intake passage of an engine;
a second end of the passage includes an atmosphere release port communicating with an atmosphere;
a first chamber and a second chamber are provided at the passage in this order from the first end side, the first chamber accommodating a first adsorbent configured to adsorb and desorb the evaporated fuel, the second chamber accommodating a second adsorbent configured to adsorb and desorb the evaporated fuel;
the passage is configured to extend substantially horizontally when the canister is mounted on the vehicle;
a flow dividing plate including a plurality of communicating holes is provided at a side of the second adsorbent in the second chamber, the side being close to the atmosphere release port; and
when the canister is mounted on the vehicle, an area of the communicating holes per unit area on a surface of the flow dividing plate is larger at a lower side of the flow dividing plate than at an upper side of the flow dividing plate.

2. The canister according to claim 1, wherein an air layer is provided between the flow dividing plate and an end portion of the second adsorbent, the end portion being close to the atmosphere release port.

3. The canister according to claim 1, wherein the second adsorbent is configured such that an evaporated fuel adsorption ability is higher at a portion, close to the atmosphere release port in an extending direction of the passage, of the second adsorbent than at a portion, far from the atmosphere release port in the extending direction of the passage, of the second adsorbent.

4. The canister according to claim 1, wherein the flow dividing plate is provided between the atmosphere release port and an end portion of the second adsorbent, the end portion being close to the atmosphere release port.

* * * * *